fig: 1
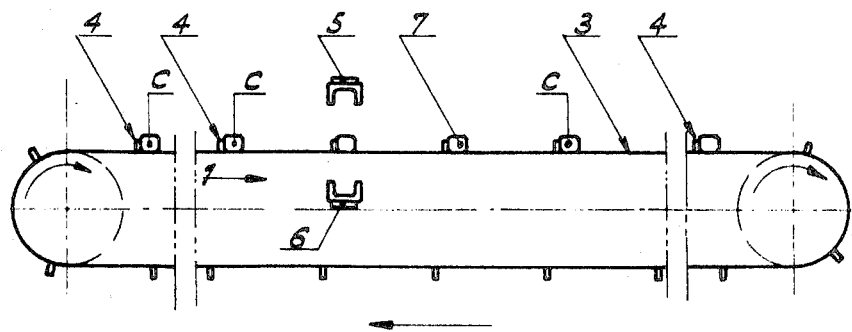
fig: 2
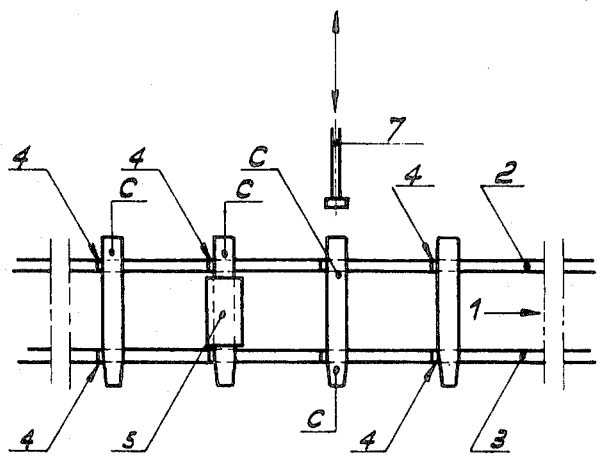
INVENTOR
Jean Godet
By Sparrow and Sparrow
ATTORNEYS

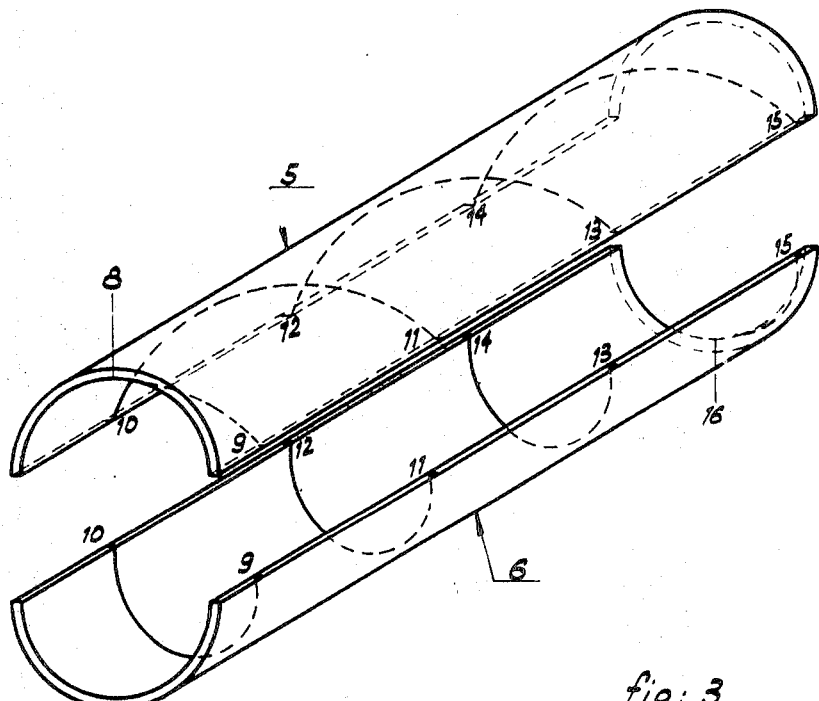
fig:3
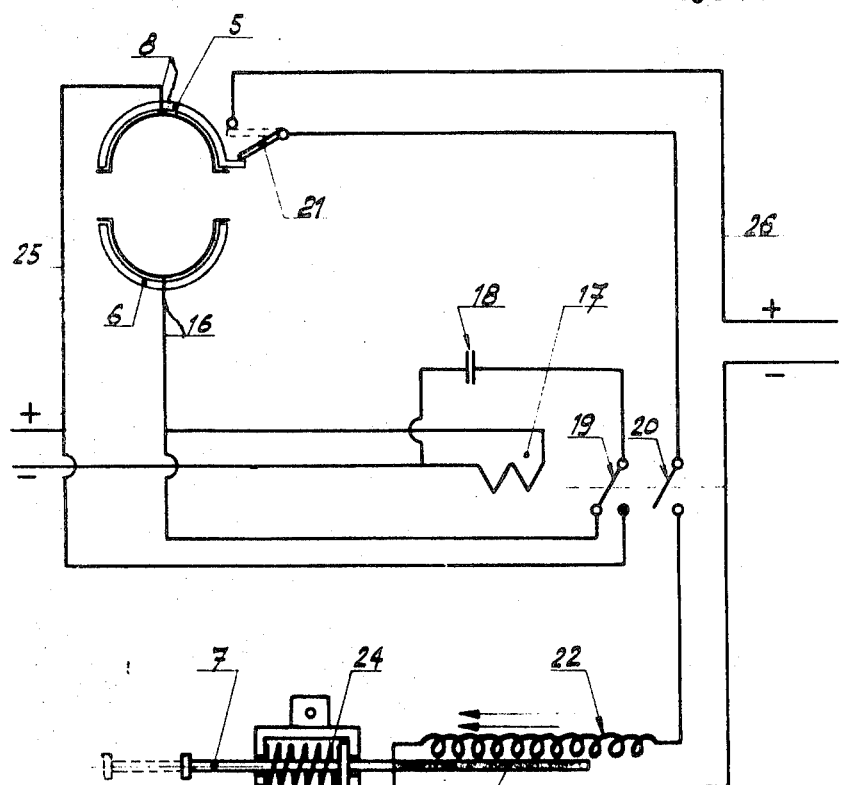
fig:4

Oct. 12, 1971 J. GODET 3,611,580
DEVICE FOR CHECKING THE CONFORMITY OF
OBJECTS WITH RESPECT TO A MODEL
Filed July 15, 1969 3 Sheets-Sheet 3

INVENTOR
Jean Godet
By
Sparrow and Sparrow
ATTORNEYS

United States Patent Office 3,611,580
Patented Oct. 12, 1971

---

3,611,580
DEVICE FOR CHECKING THE CONFORMITY OF OBJECTS WITH RESPECT TO A MODEL
Jean Godet, Le Mans, France, assignor to Service d'Exploitation Industrielle des Tabacs et des Allumettes, Paris, France
Filed July 15, 1969, Ser. No. 841,722
Claims priority, application France, July 26, 1968, 160,685
Int. Cl. B07c *5/08, 5/10;* G01b *7/00*
U.S. Cl. 33—174 L
2 Claims

ABSTRACT OF THE DISCLOSURE

Device for checking the conformity of an object with respect to a model at least at one point of the surface of said object, comprising two movable jaws each adapted to carry at least one electrically conductive element forming part of a same electric circuit, the said jaws being so arranged as to come into contact with each other at one or more checking points and the said electrically conductive elements being mounted on the said jaws so that they are connected to each other and close the said electric circuit when the jaws are in the so-called closed position of contact at the said checking point.

---

This invention is concerned with a device for checking the conformity of an object with respect to a model.

In high-speed production machines, it is necessary to check both the quality and appearance of objects which are manufactured. One of the checking operations to be carried out consists in ensuring that the objects conform to the model which is provided and that they do not exhibit any faulty appearance such as, for example, burrs, moulding fins, tearing of wrapping material and so forth.

The present invention is directed to a device for checking the conformity of an object with respect to a model at least at one point of the surface of the said object.

The device according to the invention is characterized in that it comprises an object conveyor, two jaws which are capable of moving towards each other transversely to the path followed by the object to be checked and which are actuated cyclically as a function of the length feed of the conveyor, at least one electrically conductive element on each jaw, the element or one element of a jaw being connected in series with the elements or one element of the other jaw, the element being adapted to come into contact in pairs in proximity to the object so as to permit the flow of current when the position of the elements on completion of the movement of closure of the jaws corresponds to the model in the zone of contact of the said elements.

The current flow indicator can be a device which is designed to eject from the series of objects any particular object whose shape has prevented the flow of current on completion of the displacement of the jaws towards each other.

The device according to the invention can be arranged so as to control simultaneously a number of different points of the surface of an object, the conductive elements being constituted by a helical system in which each unitary portion resulting from a longitudinal cross-section taken according to the distribution of points to be checked is attached to each jaw.

This expedient avoids the disadvantage of a device in which the junction of two continuous surfaces along the generator-line of the object to be checked could induce a signal whereas a very thin strip of material could nevertheless be present between these surfaces. This applies to a cigar wrapped in cellophane in which the thickness of the sheet of cellophane is not sufficient to prevent total contact. It is accordingly an advantage of the present invention to require simultaneous contact of all the separate points of junction, with the result that satisfactory checking is ensured.

The invention will now be explained with the aid of the figures which are annexed hereto and which present a device for checking the appearance of cigars wrapped in cellophane as these latter are being transferred on a work table for subsequent delivery to a jacketing station.

It sometimes happens that the cellophane wrapper is torn at the overlapping edge; this tear thus forms a tag which projects on one side. The device is thus capable of detecting such a tag since this latter projects beyond the correct shape of the model.

In the accompanying drawings:

FIG. 1 is a diagrammatic view showing the assembly of the device according to the invention on the cigar-transfer table;

FIG. 2 is a top view showing the central portion of the assembly which is illustrated in FIG. 1;

FIG. 3 is a view in perspective in the open position of the jaws of the device, the jaws being fitted with conductive elements which form a helix;

FIG. 4 is a diagram of the electric circuit for checking and ejecting non-standard cigars;

Figure 5:
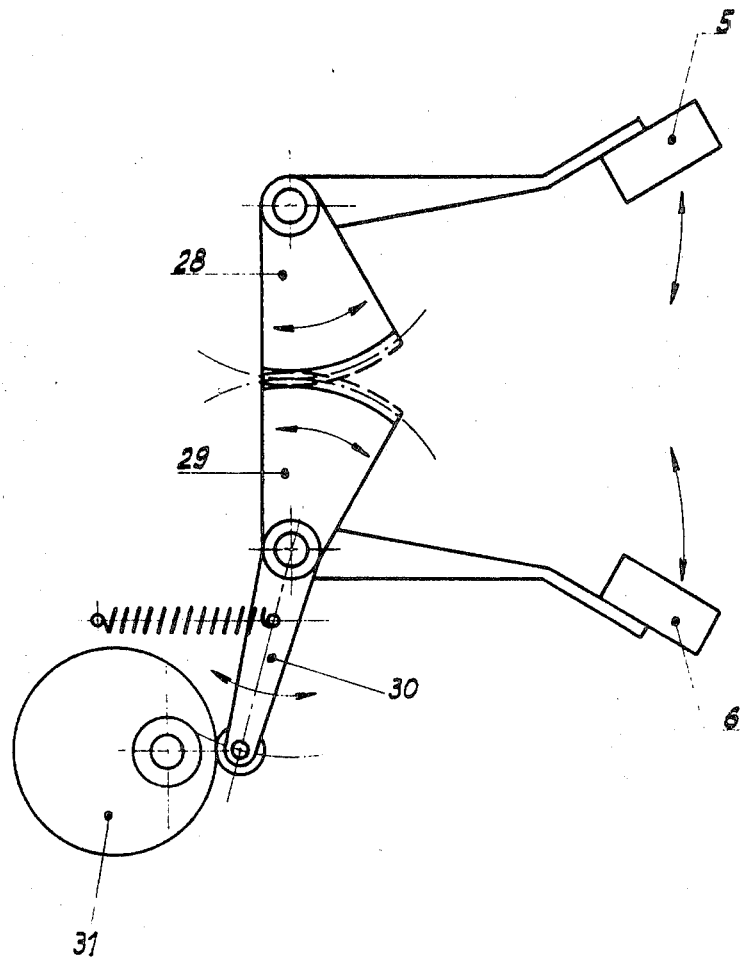
FIG. 5 is a detail view of the toothed sectors which control the movements of the jaws.

The work table 1 is constituted by two parallel conveyor-belts 2 and 3 fitted with cross-bars 4 between which are placed the cigars C so that these latter rest at each end on each conveyor-belt. The checking station comprises the jaws 5 and 6 which pass between the conveyor-belts and close over one cigar as said conveyor-belts advance by one step. An ejector device 7 is provided downstream of the checking station.

FIG. 3 shows the electrically conductive elements which are attached to the jaws 5 and 6. When said elements have been joined together at the points of contact which are designated in the figure by the same reference numerals, said elements thus form a continuous helix which is connected at 8 and 16 to a suitably supplied electric circuit 25.

The following successive elements are thus provided on the upper jaw 5: 8 to 9—10 to 11—12 to 13—14 to 15.

In the case of the lower jaw 6, the successive elements will be: 9 to 10—11 to 12—13 to 14—15 to 16.

It will be understood that the conductive elements are insulated from the jaws themselves.

In FIG. 4, the conductors of the jaws 5 and 6 are connected at the points 8 and 16 to an electric circuit which comprises a relay 17 and a capacitor 18, the relay being intended to actuate two contact blades 19 and 20.

The contact blade 20 forms part of the circuit 26 of the contactor 21 which is suitably placed with respect to the jaw 5 to permit of closure when the said jaw is in the open position. The said circuit 28 comprises an electromagnet 22 which is intended to accommodate a rod 23 within its air-gap. When the electromagnet 22 is energized, the rod 23 moves in the direction of the arrow F. The ejector 7 forms an extension of the rod 23 and is slidably mounted within a box 27. The said ejector is returned under the action of the spring 24 when the electromagnet 22 is no longer energized.

The operation of the device which has just been described is as follows:

The cigars C which are suitably presented on the conveyor-belts 2 and 3 are transferred between the crossbars 4 in step-by-step motion up to the checking station at which the said cigars are placed between the jaws 5 and 6.

During the forward movements of the conveyor 1, the jaws 5 and 6 are open. The current charges the capacitor 18 through the contact blade 19 which is not attracted by the relay 17 since this latter is not energized. When the conveyor comes to a stop, the jaws 5 and 6 which are operated by the toothed sectors 28 and 29 under the action of the arm 30 which is joined to the sector 29 move towards each other and the elements arrive at the points of contact. The toothed sectors are actuated by the cam 31, the eccentric projection of which is designed to correspond to the step-by- step displacement of the conveyor 1.

If the cigar is found to conform to the accepted standard, all the elements are accordingly in contact. The current then passes from 8 to 16 through the entire helix, whereupon the relay 17 is energized. The contact blades 19 and 20 are both attracted. As soon as the jaws open, the capacitor 18 discharges through the relay 17 which maintains the contact blades 19 and 20 in the position shown in the drawings.

When the jaw 5 closes the contact 21, the electromagnet 22 cannot actuate the ejector since the contact 20 is held open as a result of suitable calibration of the capacitor 18 throughout the period during which the said jaw 5 holds the contact 21 in the closed position.

On the contrary, if the cigar has not been found to conform to the standard, at least one of the jaw elements has prevented current from flowing through the circuit 25.

Thus, the relay 17 is not energized and the contact blade 20 remains in the position of closure of the circuit 26.

When the jaw 5 closes the contact 21, the electromagnet 22 is energized by the current supplied through the circuit 26 and actuates the ejector 7 which discharges the defective cigar. When the jaws close again, the electromagnet is no longer energized and the spring 24 returns the ejector 7.

What I claim is:

1. A device for checking the conformity of an object with respect to a model at least at one point of the surface of said object, comprising two movable jaws, one of said jaws carrying at least two conductive elements and the other of said jaws carrying at least one conductive element, the said jaws being so arranged as to come into contact with each other at at least one checking point and the said electrically conductive elements being mounted on the said jaws so that they are connected in series and close an electric circuit when the jaws are in the closed position of contact at the said checking point.

2. A device in accordance with claim 1, wherein the conductive elements are arranged on both jaws so as to form a continuous helix when the jaws are in the closed position.

References Cited

UNITED STATES PATENTS

| | | | |
|---|---|---|---|
| 2,999,589 | 9/1961 | Norwich | 209—82 |
| 2,999,591 | 9/1961 | Crump | 209—82 |
| 3,206,025 | 9/1965 | Ochs | 209—88 |
| 3,477,197 | 11/1969 | Budz | 209—80 X |

FOREIGN PATENTS

| | | | |
|---|---|---|---|
| 129,648 | 9/1945 | Australia | 209—80 |

EVON C. BLUNK, Primary Examiner

W. S. CARSON, Assistant Examiner

U.S. Cl. X.R.

209—80